(12) United States Patent
Kar

(10) Patent No.: US 8,620,622 B2
(45) Date of Patent: Dec. 31, 2013

(54) SYSTEM AND METHOD FOR DETERMINING HEALTH INDICATORS FOR IMPELLERS

(75) Inventor: Chinmaya Kar, Karnataka (IN)

(73) Assignee: Honeywell International Inc., Morristown, NJ (US)

(*) Notice: Subject to any disclaimer, the term of this patent is extended or adjusted under 35 U.S.C. 154(b) by 208 days.

(21) Appl. No.: 12/417,452

(22) Filed: Apr. 2, 2009

(65) Prior Publication Data

US 2010/0256953 A1 Oct. 7, 2010

(51) Int. Cl.
G06F 11/30 (2006.01)
G21C 17/00 (2006.01)

(52) U.S. Cl.
USPC .......................................... 702/185; 324/520

(58) Field of Classification Search
USPC ........................................................ 702/185
See application file for complete search history.

(56) References Cited

U.S. PATENT DOCUMENTS

| | | |
|---|---|---|
| 2,799,015 A | 7/1957 | Bell |
| 2,883,255 A | 4/1959 | Anderson |
| 3,242,321 A | 3/1966 | Chope |
| 4,286,515 A | 9/1981 | Baumann et al. |
| 4,621,177 A | 11/1986 | Pulkowski et al. |
| 4,675,487 A | 6/1987 | Verkasalo |
| 4,704,191 A | 11/1987 | Wedel |
| 4,885,707 A * | 12/1989 | Nichol et al. ................... 702/56 |
| 5,262,958 A | 11/1993 | Chui et al. |
| 5,381,697 A | 1/1995 | van der Pol |
| 5,479,824 A * | 1/1996 | Torres ............................. 73/602 |
| 5,519,337 A * | 5/1996 | Casada .................... 324/765.01 |
| 5,594,180 A | 1/1997 | Carpenter et al. |
| 5,616,824 A | 4/1997 | Abdel-Malek et al. |
| 5,641,891 A | 6/1997 | Frankl et al. |
| 5,646,600 A | 7/1997 | Abdel-Malek et al. |
| 5,750,879 A | 5/1998 | Ohtsuka et al. |
| 5,939,625 A | 8/1999 | Torii et al. |
| 5,963,884 A | 10/1999 | Billington et al. |

(Continued)

FOREIGN PATENT DOCUMENTS

EP 1 097 363 B1 12/2007
JP 62226033 A 10/1987

(Continued)

OTHER PUBLICATIONS

International Search Report dated Dec. 9, 2010 in connection with International Patnt Application No. PCT/US2010/028258.

(Continued)

*Primary Examiner* — Sujoy Kundu
*Assistant Examiner* — Regis Betsch

(57) ABSTRACT

A system includes a plurality of sensors configured to measure one or more characteristics of an impeller. The system also includes an impeller condition indicator device, which includes a plurality of sensor interfaces configured to receive input signals associated with at least one stage of the impeller from the sensors. The impeller condition indicator device also includes a processor configured to identify a fault in the impeller using the input signals and an output interface configured to provide an indicator identifying the fault. The processor is configured to identify the fault by determining a family of frequencies related to at least one failure mode of the impeller, decomposing the input signals using the family of frequencies, reconstructing a impeller signal using the decomposed input signals, and comparing the reconstructed impeller signal to a baseline signal. The family of frequencies includes a vane pass frequency and its harmonics.

21 Claims, 11 Drawing Sheets

(56) References Cited

U.S. PATENT DOCUMENTS

| | | | |
|---|---|---|---|
| 5,966,674 A | 10/1999 | Crawford et al. | |
| 6,208,943 B1 | 3/2001 | Randolph et al. | |
| 6,330,525 B1* | 12/2001 | Hays et al. | 702/183 |
| 6,349,637 B1 | 2/2002 | Molteni | |
| 6,408,676 B1 | 6/2002 | Stratton et al. | |
| 6,484,109 B1* | 11/2002 | Lofall | 702/56 |
| 6,505,517 B1 | 1/2003 | Eryurek et al. | |
| 6,539,315 B1 | 3/2003 | Adams et al. | |
| 6,634,000 B1 | 10/2003 | Jammu et al. | |
| 6,654,697 B1 | 11/2003 | Eryurek et al. | |
| 6,657,529 B1 | 12/2003 | Albach | |
| 6,681,634 B2* | 1/2004 | Sabini et al. | 73/593 |
| 6,691,249 B1 | 2/2004 | Barford et al. | |
| 6,708,291 B1 | 3/2004 | Kidder | |
| 6,725,167 B2 | 4/2004 | Grumstrup et al. | |
| 6,727,725 B2 | 4/2004 | Devaney et al. | |
| 6,757,668 B1 | 6/2004 | Goebel et al. | |
| 6,845,340 B2 | 1/2005 | Edie et al. | |
| 6,900,420 B2 | 5/2005 | Markegard et al. | |
| 6,933,693 B2* | 8/2005 | Schuchmann | 318/432 |
| 6,941,785 B2 | 9/2005 | Haynes et al. | |
| 7,257,501 B2 | 8/2007 | Zhan et al. | |
| 7,274,995 B2 | 9/2007 | Zhan et al. | |
| 7,286,945 B2 | 10/2007 | Zhan et al. | |
| 7,421,374 B2 | 9/2008 | Zhan et al. | |
| 7,509,234 B2 | 3/2009 | Unnikrishnan et al. | |
| 7,640,139 B2 | 12/2009 | Sahara et al. | |
| 7,640,802 B2 | 1/2010 | King et al. | |
| 2002/0020144 A1 | 2/2002 | Sarles et al. | |
| 2002/0152052 A1 | 10/2002 | Tsuru | |
| 2003/0019297 A1 | 1/2003 | Fiebelkorn et al. | |
| 2003/0216888 A1 | 11/2003 | Ridolfo | |
| 2004/0024568 A1 | 2/2004 | Eryurek et al. | |
| 2004/0159112 A1 | 8/2004 | Jayanth et al. | |
| 2004/0199828 A1 | 10/2004 | Cabezas et al. | |
| 2005/0104020 A1 | 5/2005 | Zhan et al. | |
| 2006/0025970 A1 | 2/2006 | Wegerich | |
| 2006/0071666 A1 | 4/2006 | Unsworth et al. | |
| 2007/0088534 A1 | 4/2007 | MacArthur et al. | |
| 2008/0033695 A1 | 2/2008 | Sahara et al. | |
| 2009/0049338 A1 | 2/2009 | Unnikrishnan et al. | |
| 2010/0030492 A1 | 2/2010 | Kar et al. | |
| 2010/0145639 A1 | 6/2010 | Fu et al. | |

FOREIGN PATENT DOCUMENTS

| | | | |
|---|---|---|---|
| JP | 07-43278 B2 | 5/1995 | |
| JP | 407190849 A | 7/1995 | |
| JP | 2005147081 A | 6/2005 | |
| KR | 20030048779 A | 6/2003 | |
| KR | 20050011919 A | 1/2005 | |
| WO | WO 00/04361 A1 | 1/2000 | |
| WO | WO 03/090091 A1 | 10/2003 | |

OTHER PUBLICATIONS

Written Opinion of the International Searching Authority dated Dec. 9, 2010 in connection with International Patnt Application No. PCT/US2010/028258.

Simon G. Braun, "The Signature Analysis of Sonic Bearing Vibrations", IEEE Transactions on Sonics and Ultrasonics, vol. SU-27, No. 6, Nov. 1980, pp. 317-327.

Y. Gao et al., "Wavelet-Based Pressure Analysis for Hydraulic Pump Health Diagnosis", Transactions of the ASAE, vol. 46(4), pp. 969-976.

Horch A, "A Simple Method for Detection of Stiction in Control Valves", Control Engineering Practice, Pergamon Press, Oxford, GB, vol. 7, 1999, pp. 1221-1231.

Jiang Wanlu et al., "Applying Multiresolution Analysis for Processing of Hydraulic Pump Fault Signal", Fifth International Conference on Fluid Power Transmission and Control, Hangzhou, China, Apr. 2001, pp. 1-5.

Fujun He et al. "WPT-SVMs Based Approach for Fault Detection of Valves in Reciprocating Pumps", Proceedings of the American Control Conference, Anchorage, AK, May 8-10, 2002, pp. 4566-4570.

Mallat et al., "Singularity Detection and Processing with Wavelets", Mar. 1992, IEEE Transactions on Information Theory, vol. 38, No. 2, pp. 617-643.

Wang et al., "The Fault Character of the Motors Identified Based on Wavelet Transform", Nov. 2-5, 2003, Proceedings of the Second International Conference on Machine Learning and Cybernetics, Xi'an, pp. 2394-2398.

Gao et al., Support Vector Machines Based Apprroach for Fault Diagnosis of Valves in Reciprocating Pumps, 2002 IEEE Canadian Conference, pp. 1622-1627.

Ren et al., Fault Feature Extracting by Wavelet Transform for Control System Fault Detection and Diagnosis, 2000 IEEE, International Conference on Control Applications, pp. 485-489.

International Search Report for PCT/US2004/038766, issued by the International Searching Authority, mailed Apr. 14, 2005, by the European Patent Office, P.B. 5818 Patentlaan 2, NL—2280 HV Rijswijk.

Parvez S. et al., A Wavelet-Based Multi-Resolution PID Controller, 2003 IEEE Conference, Salt Lake City, UT, Oct. 2003, vol. 3 of 3, Conf. 38, pp. 1-5.

Zhihan Xu et al., Design of-Fault Detection and Isolation Via Wavelet Analysis and Neural Network, 2002 IEEE International Symposium, Vancouver, Canada, Oct. 2002, pp. 467-472.

Song Zhihuan et al., Adaptive Predictive Control Based on Wavelet Approximation Models, IEEE Conference, Beijing China, Oct. 1996, vol. 2, pp. 820-824.

Xiaohua Xia et al., Nonlinear Adaptive Predictive Control Based on Orthogonal Wavelet Networks, Shanghai China, Jun. 2002, vol. 1, pp. 305-311.

Nounou M N et al., Multiscale Fuzzy System Identification, Journal of Process Control, Oxford, GB, vol. 15, No. 7, Oct. 2005, pp. 763-770.

Billings S A et al., Discrete Wavelet Models for Identification and Qualitative Analysis of Chaotic Systems, Singapore, SG, vol. 9, No. 7, Jul. 1999, pp. 1263-1284.

A. R. Mohanty, et al., "Fault Detection in a Multistage Gearbox by Demodulation of Motor Current Waveform", IEEE Transactions on Industrial Electronics, vol. 53, No. 4, Aug. 2006, p. 1285-1297.

Chinmaya Kar, et al., "Monitoring gear vibrations through motor current signature analysis and wavelet transform", Mechanical System and Signal Processing 20 (2006), p. 158-187.

Chinmaya Kar, "System and Method for Gearbox Health Monitoring", U.S. Appl. No. 12/417,475, filed Apr. 2, 2009.

Laibin Zhang, et al., "Short-term fault prediction of mechanical rotating parts on the basis of fuzzy-grey optimising method", Mechanical Systems and Signal Processing 21 (2007), p. 856-865.

Michael J. Devaney, et al., "Detecting Motor Bearing Faults", IEEE Instrumentation & Measurements Magazine, Dec. 2004, p. 30-35 & 50.

Jason R. Stack, et al., "Fault Classification and Fault Signature Production for Rolling Element Bearings in Electric Machines", IEEE Transactions on Industry Applications, vol. 40, No. 3 May/Jun. 2004, p. 735-739.

Peter W. Tse, et al., "Wavelet Analysis and Envelope Detection for Rolling Element Bearing Fault Diagnosis—Their Effectiveness and Flexibilities", Journal of Vibration and Acoustics, Jul. 2001, vol. 123, p. 303-310.

V. Sugumaran, et al., "Automatic rule learning using decision tree for fuzzy classifier in fault diagnosis of roller bearing", Mechanical Systems and Signal Processing 21 (2007), p. 2237-2247.

Yaguo Lei, et al., "Fault diagnosis of rotating machinery based on multiple ANFIS combination with GA s", Mechanical Systems and Signal Processing 21 (2007), p. 2280-2294.

Jason R. Stack, et al., "An Amplitude Modulation Detector for Fault Diagnosis in Rolling Element Bearings", IEEE Transactions on Industrial Electronics, vol. 51, No. 5, Oct. 2004, p. 1097-1102.

Robert B. Randall, "State of the Art in Monitoring Rotating Machinery-Part 1", Sound and Vibration, Mar. 2004, p. 14-20.

(56) References Cited

OTHER PUBLICATIONS

Z.K. Peng, et al., "A comparison study of improved Hilbert-Huang transform and wavelet transform: Application to Fault disgnosis for rolling bearing", Mechanical Systems and Signal Processing 19 (2005), p. 974-988.

Xinsheng Lou, et al., "Bearing fault diagnosis based on wavelet transform and fuzzy inference", Mechanical Systems and Signal Processing 18 (2004) p. 1077-1095.

T.I. Liu, et al., "Detection of Roller Bearing Defects Using Expert System and Fuzzy Logic", Mechanical Systems and Signal Processing (1996) 10(5), p. 595-614.

Yaguo Lei, et al., "A new approach to intelligent fault diagnosis of rotating machinery", Expert Systems with Applictaions 35 (2008), p. 1593-1600.

Paula J. Dempsey, et al., "Tapered Roller Bearing Damage Detection Using Decision Fusion Analysis", NASA/TM-2006-21430, Jul. 2006, 23 pages.

A.R. Mohanty, et al., "Fault Detection in a Multistage Gearbox by Demodulation of Motor Current Waveform", IEEE Transactions on Industrial Electronics, vol. 53, No. 4, Aug. 2006, p. 1285-1297.

Chinmaya Kar, et al., "Vibration and current transient monitoring for gearbox fault detection using multiresolution Fourier transform", Journal of Sound and Vibration 311 (2008), p. 109-132.

Chinmaya Kar, et al., "Monitoring gear vibrations through motor current signature analysis and wavelet transform", Mechanical Systems and Signal Processing 20 (2006), p. 158-187.

T. Lindth et al., "Automatic bearing fault classification combining statistical classification and fuzzy logic", 4th Nordic Workshop in Power & Industrial Electronics, Jun. 2004, 5 pages.

Carl S. Byington, P.E., et al., "In-Line Health Monitoring System for Hydraulic Pumps and Motors", 2003 IEEE, 9 pages.

Kai F. Goebel, "Conflict Resolution Using Strengthening and Weakening Operations in Decision Fusion", Proceedings of the 4th Annual Conference on Information Fusion, Fusion 2001, pp. ThA1-19-ThA1-25, 2001.

Sanket Amin, et al., "Fuzzy Inference and Fusion for Health State Diagnosis of Hydraulic Pumps and Motors", AFDDPS-NAFIPS, Jun. 2005, 6 pages.

B.P. Lathi, "Linear Syustems and Signals", 1992, Berkeley-Cambridge Press, p. 574-580.

Chinmaya Kar, et al., "System and Method for Conflict Resolution to Support Simultaneous Monitoring or Multiple Subsystems", U.S. Appl. No. 12/797,472, filed Jun. 9, 2010.

Chinmaya Kar, et al., "Severity Analysis Apparatus and Method for Shafts of Rotating Machinery", U.S. Appl. No. 13/166,205, filed Jun. 22, 2011.

Chinmaya Kar, "Rule-Based Diagnostics Apparatus and Method for Rotating Machinery", U.S. Appl. No. 13/166,524, filed Jun. 22, 2011.

Notification of Transmittal of the International Search Report and The Written Opinion of the International Searching Authority, or the Declaration dated Dec. 7, 2011 in connection with International Patent Application No. PCT/US2011/038856.

* cited by examiner

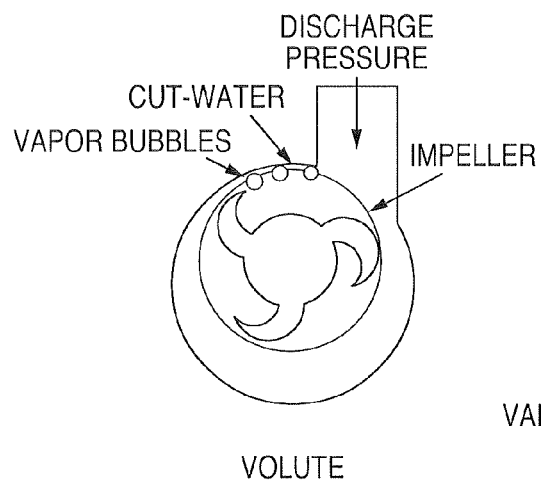
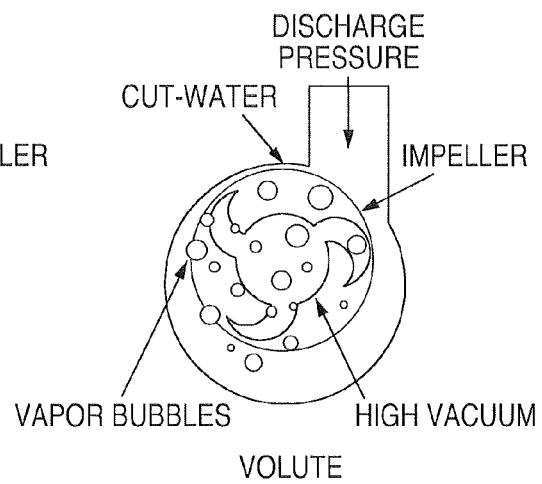
FIG. 2A
FIG. 2B
| 300 | $f_r$ | $f_{vans}$ | $f_{vans}-f_r$ | $f_{vans}+f_r$ | Back-ground Noise |
|---|---|---|---|---|---|
| 302 High Flow Cavitations | | ⇓ | ⇓ | ⇓ | ⇑ |
| 304 Low Flow Cavitations | | ⇓ | ⇓ | ⇓ | ⇑ |
| 306 Impeller Wear | | ⇑ | ⇓ | ⇓ | |
| 310 Impeller Crack | ⇑ | ⇓ | ⇑ | ⇑ | |
| 312 Impeller Vane Breakage | ⇑ | ⇓ | ⇑ | ⇑ | |
FIG. 3

SYSTEM AND METHOD FOR DETERMINING HEALTH INDICATORS FOR IMPELLERS

TECHNICAL FIELD

This disclosure relates generally to impeller devices and, more specifically, to a system and method for determining health indicators for impellers.

BACKGROUND

Impellers are routinely used in various industries. One type of impeller includes a rotor used to increase the pressure and flow of a fluid inside a cylinder, tube, or other conduit. Impellers are often used, for example, in the process control industry. However, impellers routinely suffer from various failures. Example failure modes of an impeller can include vane breakage, one or more cracks in the impeller, and wear in the impeller.

It is often necessary or desirable to monitor the health of an impeller in a process control system or other system in order to properly schedule maintenance for the impeller. However, it is often difficult to monitor the health of impellers because of the wide variety of impellers in use.

SUMMARY

This disclosure provides a system and method for determining health indicators for impellers.

In a first embodiment, an apparatus includes an input interface configured to receive an input signal associated with at least one stage of an impeller. The apparatus also includes a processor configured to identify a fault in the impeller using the input signal. The apparatus further includes an output interface configured to provide an indicator identifying the fault. The processor is configured to identify the fault by determining a family of frequencies related to at least one failure mode of the impeller, decomposing the input signal using the family of frequencies, reconstructing an impeller signal using the decomposed input signal, and comparing the reconstructed impeller signal to a baseline signal. The family of frequencies includes a vane pass frequency and its harmonics.

In a second embodiment, a system includes a plurality of sensors configured to measure one or more characteristics of an impeller. The system also includes an impeller condition indicator device, which includes a plurality of sensor interfaces configured to receive input signals associated with at least one stage of the impeller from the sensors. The impeller condition indicator device also includes a processor configured to identify a fault in the impeller using the input signals and an output interface configured to provide an indicator identifying the fault. The processor is configured to identify the fault by determining a family of frequencies related to at least one failure mode of the impeller, decomposing the input signals using the family of frequencies, reconstructing an impeller signal using the decomposed input signals, and comparing the reconstructed impeller signal to a baseline signal. The family of frequencies includes a vane pass frequency and its harmonics.

In a third embodiment, a method includes receiving an input signal having vibration and/or speed information corresponding to at least one stage of an impeller. The method also includes determining a family of frequencies corresponding to at least one failure mode of the impeller, where the family of frequencies includes a vane pass frequency and its harmonics. The method further includes decomposing the input signal using the family of frequencies and reconstructing an impeller signal using the decomposed input signal. In addition, the method includes comparing the reconstructed impeller signal to a baseline signal and outputting an indicator identifying a fault when the reconstructed impeller signal differs from the baseline signal by a threshold amount.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 2A and 2B illustrate example cavitation locations;

FIG. 3 illustrates an example table for impeller failure mode rules according to this disclosure;

DETAILED DESCRIPTION

Figure 1A:
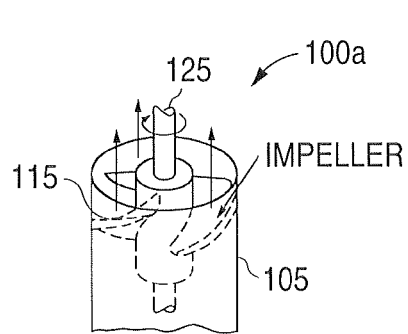
FIGS. 1A through 1G illustrates example impeller configurations.
Figure 1B:
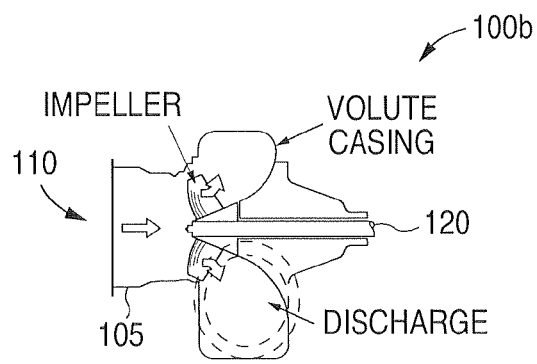
Figure 1C:
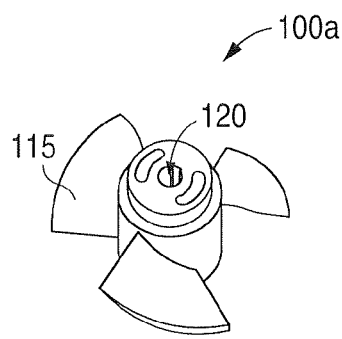

FIGS. 1 through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system. Also, it will be understood that elements in the figures are illustrated for simplicity and clarity and have not necessarily been drawn to scale. For example, the dimensions of some elements in the figures may be exaggerated relative to other elements to help improve the understanding of various embodiments described in this patent document.

FIGS. 1A through 1G illustrates example impeller configurations. In FIGS. 1A through 1D, impellers 100a-100b include a rotor inside a cylinder, tube, or other conduit 105. The rotor is used to increase the pressure and flow of a fluid inside the conduit 105. The conduit 105 includes an open inlet 110 (often referred to as an "eye") that accepts incoming fluid. Vanes 115 push the fluid radially within the conduit 105. The vanes 115 can, for example, represent backward curved blades 115a, radial blades 115b, or forward inclined blades 115c. A splined, keyed, or threaded bore 120 accepts a driveshaft 125, which causes the vanes 115 to rotate. The impellers 100a-100b can be made of iron, steel, bronze, brass, aluminum, plastic, or other suitable material(s). The impeller 100a represents an axial flow impeller, and the impeller 100b represents a mixed flow impeller.

Figure 1F:
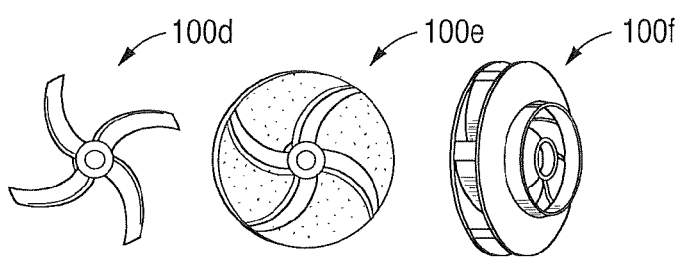
Figure 1D:
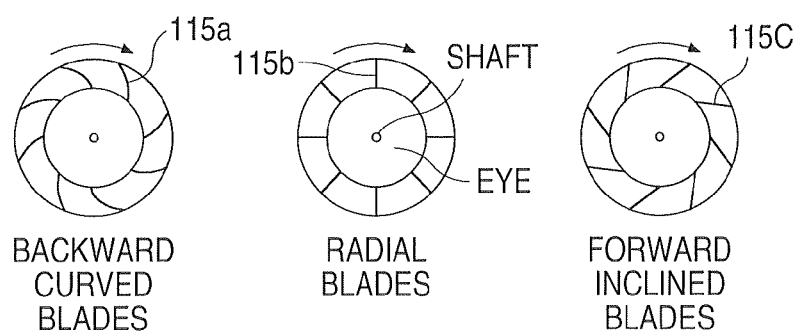
Figure 1E:
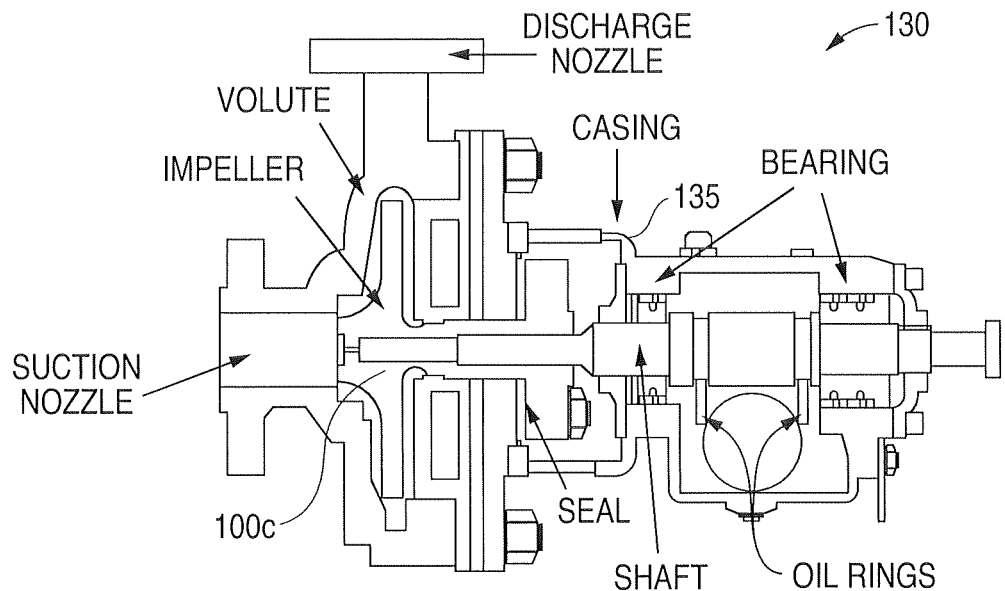

As shown in FIG. 1E, an impeller 100c also can be used as the rotating component of a centrifugal pump 130. The impeller 100c transfers or converts rotating and/or kinetic energy from a motor that drives the pump 130 into potential energy of the pumped fluid by accelerating the fluid outwards from the center of rotation. The velocity achieved by the impeller 100c translates into pressure when a pump casing 135 confines the outward movement of the fluid.

Figure 1G:
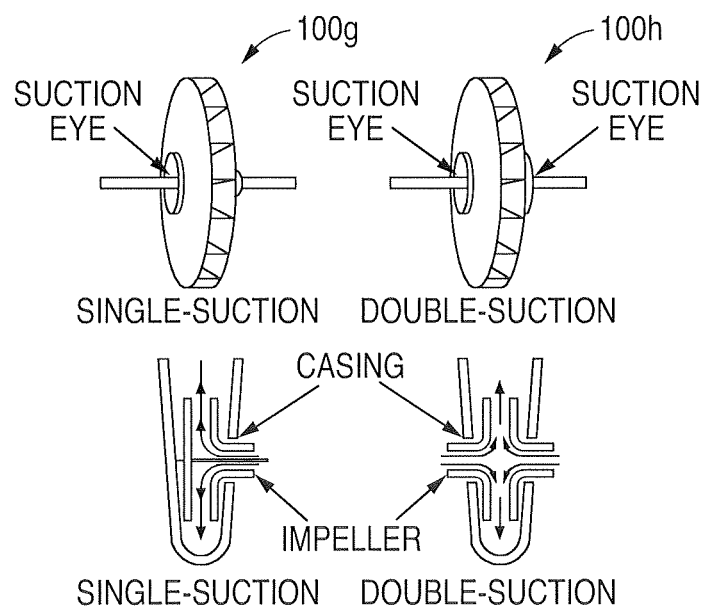

FIGS. 1F and 1G illustrate additional types of impellers. In particular, FIG. 1F illustrates an open impeller 100d, a semi-open impeller 100e, and a closed impeller 100f. FIG. 1G illustrates a single suction impeller 100g and a double suction impeller 100h.

In addition to selecting a particular type of impeller, the design of the particular impeller can be varied to alter its performance characteristics. For example, an impeller with a large number of vanes or with vanes having large angles may have an increased "head" of the fluid. Also, an impeller with a low number of vanes or with large vane outlet angles may have poor vibration characteristics or heavy loads at the tips. Further, a larger clearance between an impeller and its casing may decrease vibration but result in an increase in size, weight, and cost.

One hydraulic phenomenon associated with the use of impellers is cavitation, which is illustrated in FIGS. 2A and 2B. Cavitation is a phenomenon where vapor bubbles form in a flowing liquid in or around a region where the pressure of the liquid falls below its vapor pressure. FIG. 2A illustrates cavitation located at the discharge of an impeller, while FIG. 2B illustrates cavitation located at the suction of an impeller.

Cavitation can be divided into two classes of behavior, namely inertial (or transient) cavitation and noninertial cavitation. Inertial cavitation is the process where a void or bubble in a liquid rapidly collapses, producing a shock wave. Noninertial cavitation is the process where a bubble in a fluid is forced to oscillate in size or shape due to some form of energy input, such as an acoustic field. Both types of cavitation can occur when using impellers. Moreover, the shock waves formed by cavitation may be strong enough to significantly damage moving parts, which can facilitate the erosion of an impeller and its casing or other damage to the impeller.

It is often difficult to monitor the health of a number of impellers due, among other things, to the various types of impellers that are in use. In accordance with this disclosure, an impeller health monitoring system is provided that can monitor the health of one or more impellers and provide an indication when a particular impeller is suffering from wear or other problems.

FIG. 3 illustrates an example table 300 for impeller failure mode rules according to this disclosure. The embodiment of the table 300 shown in FIG. 3 is for illustration only. Other embodiments of the table 300 could be used without departing from the scope of this disclosure.

In this example, the table 300 includes five failure conditions. The failure conditions include high flow cavitations 302, low flow cavitations 304, impeller wear 306, impeller cracking 310, and impeller vane breakage 312. The table 300 identifies the effects of these failure conditions on various frequencies associated with operation of the impeller. The impeller frequencies include the rotating shaft speed frequency ($f_r$) 322, the vane pass frequency ($f_{vane}$) 324, the shaft sideband frequencies ($f_{vane}-f_r$) 326 and ($f_{vane}+f_r$) 328, and background noise 330.

If high flow cavitations 302 or low flow cavitations 304 occur, the frequencies $f_{vane}$ 324, $f_{vane}-f_r$ 326 and $f_{vane}+f_r$ 328 decrease, and the background noise 330 increases. If impeller wear 306 occurs, the frequency $f_{vane}$ 324 increases, while the frequencies $f_{vane}-f_r$ 326 and $f_{vane}+f_r$ 328 decrease. Impeller cracking 310 results in an increase in each of the frequencies $f_r$ 322, $f_{vane}-f_r$ 326, and $f_{vane}+f_r$ 328, and the frequency $f_{vane}$ 324 decreases. An impeller vane breakage 312 increases the frequencies $f_r$ 322, $f_{vane}-f_r$ 326, and $f_{vane}+f_r$ 328 while causing a decrease in the frequency $f_{vane}$ 324. With these rules in mind, an impeller health monitoring system can monitor the health of one or more impellers and can identify a specific failure mode for each impeller (if any).

Figure 4A:
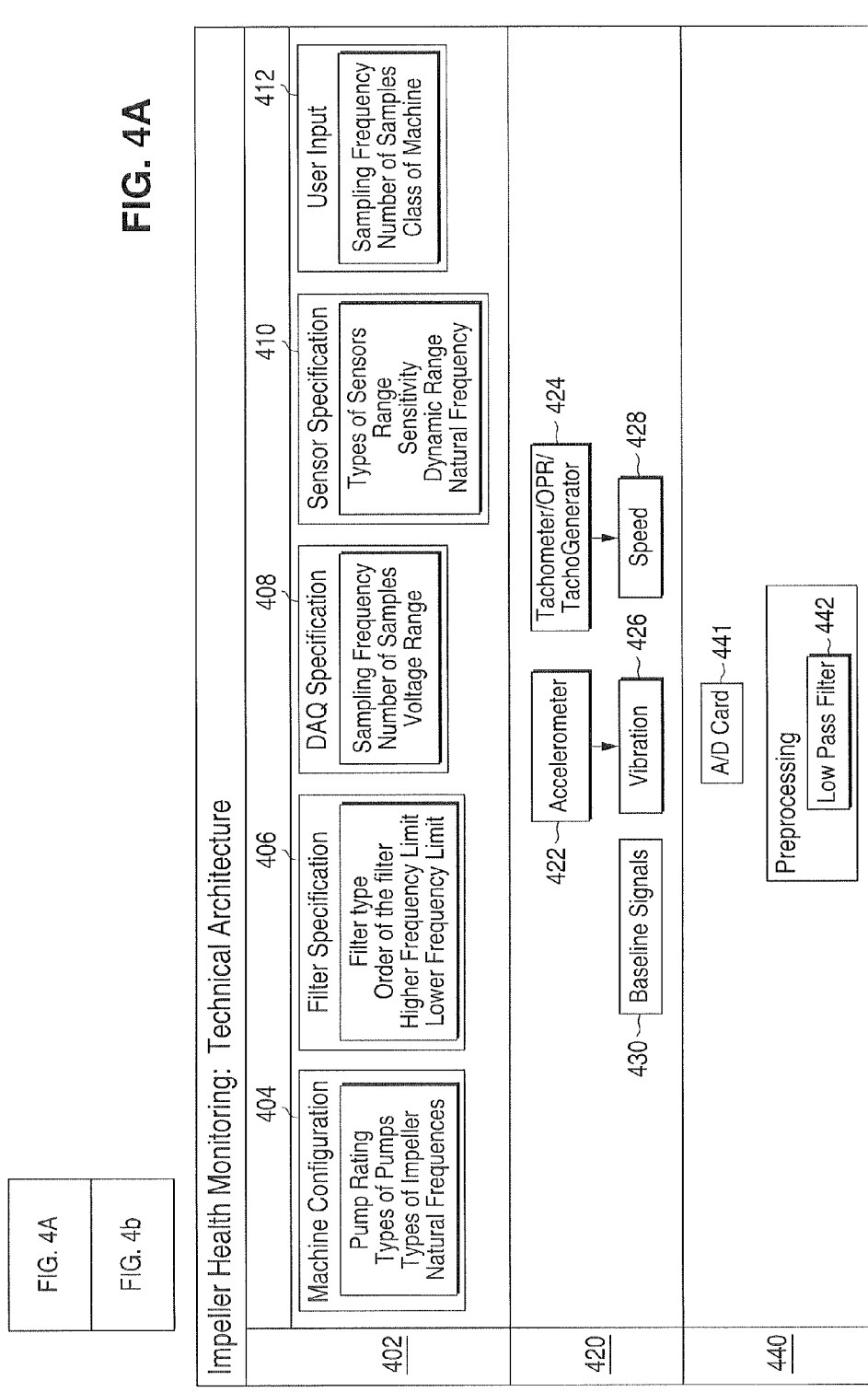
FIG. 4 illustrates an example Impeller Condition Indicator (ICI) device according to this disclosure.
Figure 4B:
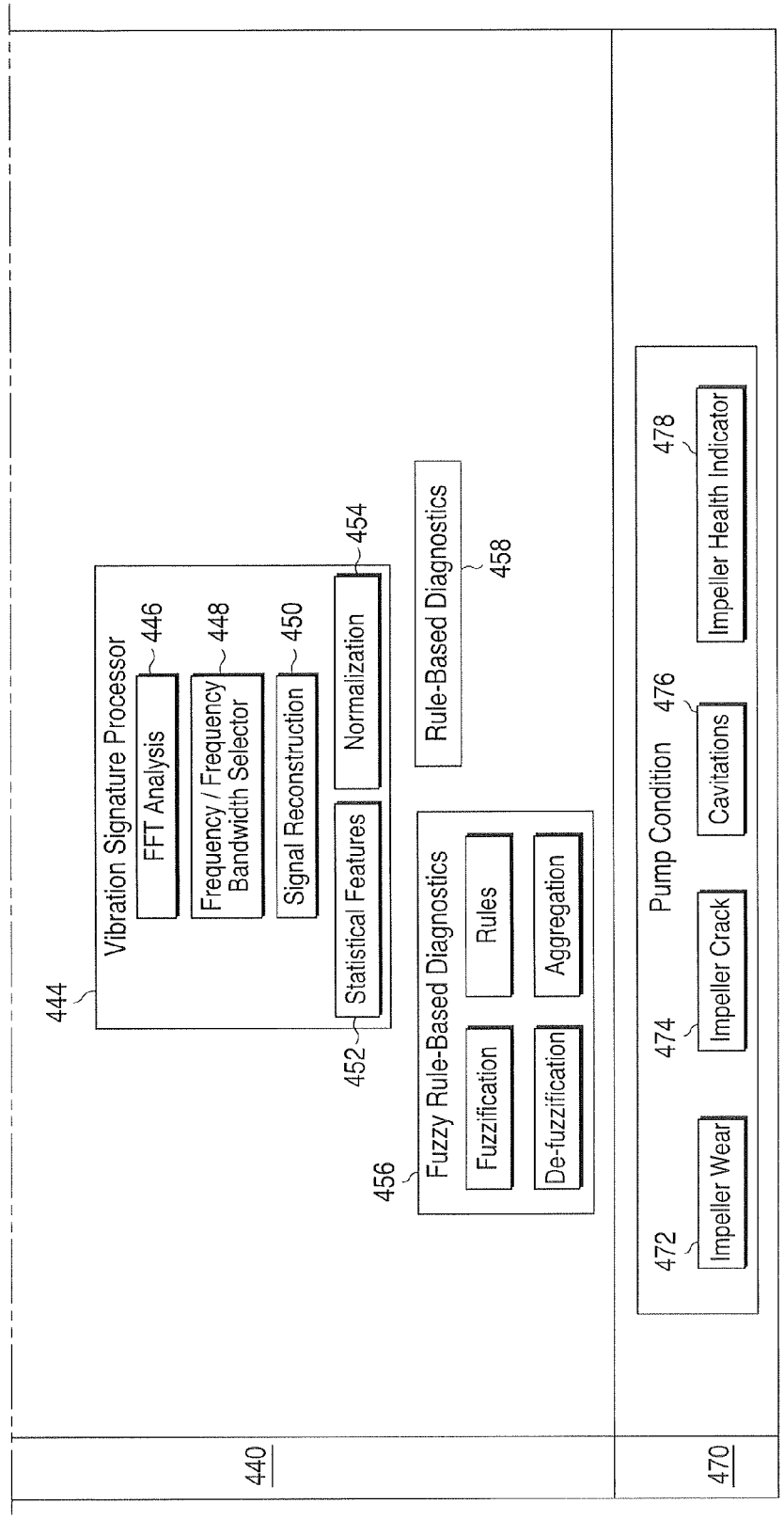

FIG. 4 illustrates an example Impeller Condition Indicator (ICI) device 400 according to this disclosure. The embodiment of the ICI device 400 shown in FIG. 4 is for illustration only. Other embodiments of the ICI device 400 could be used without departing from the scope of this disclosure.

In this example, the ICI device 400 includes a user configuration portion 402. The user configuration portion 402 provides a user interface that facilitates operator interaction with the ICI device 400. For example, the user configuration portion 402 may enable an operator to enter impeller configuration information. As particular examples, the user configuration portion 402 may allow the operator to enter a machine configuration 404. The machine configuration 404 may include a pump rating, one or more types of pumps, one or more types of impellers, and one or more natural frequencies of the machine.

The operator may also enter a filter specification 406. The filter specification 406 may include a filter type, an order of the filter, a higher frequency limit, and a lower frequency limit. Data Acquisition (DAQ) specifications 408 may further be entered by the operation in the user configuration portion 402. The DAQ specification 408 may include a sampling frequency, a number of samples, and a voltage range. In addition, the operator may enter sensor specifications 410 and additional user inputs 412. The sensor specifications 410 may include types of sensors, sensor ranges and sensitivities, and sensor dynamic ranges and natural frequencies. The additional user inputs 412 may include sampling frequency, a number of samples, and a class of machine.

The ICI device 400 also includes a sensor signal portion 420. The sensor signal portion 420 provides an interface for receiving inputs from sensors coupled to, or otherwise associated with, an impeller and/or a centrifugal pump or other device that includes an impeller. In this example, the sensor signal portion 420 includes interfaces to an accelerometer 422 and a tachometer 424. The accelerometer 422 detects, measures, and records a vibration 426 of an impeller or device containing the impeller. The tachometer 424 can be a sensor input device such as a tachogenerator or Once Per Revolution (OPR) device. The tachometer 424 detects, measures, and records speed 428 of an impeller or device containing the impeller. The sensor signal portion 420 also can store baseline signals 430 for the impeller or device containing the impeller.

The ICI device 400 further includes an Artificial Intelligence (AI) portion or other processing portion 440. In this example, the AI portion 440 includes an analog-to-digital converter 441, a pre-processing filter 442, and a vibration signature processor 444. The vibration signature processor 444 can include one or more processors or other components adapted to perform FFT analysis 446, Frequency/Frequency Bandwidth Selection (FFBS) 448, signal reconstruction 450, statistical features recordation 452, and normalization 454. The AI portion 440 is also able to perform Fuzzy Rule-Based Diagnostics 456 and Rule-Based Diagnostics 458. The Fuzzy Rule-Based Diagnostics 456 include Fuzzification, Rules, Aggregation and De-fuzzification operations. These functions are described in more detail below.

In addition, the ICI device 400 includes an output interface 470. The output interface 470 represents an interface configured to send information to another system or device, such as a computer or a display. The output interface 470 could also represent a single display (e.g., a monitor) or multiple displays. In this example, the output interface 470 includes an impeller wear indicator 472, an impeller crack indicator 474, a cavitations indicator 476, and an impeller health indicator 478. These indicators 472-478 identify the health of the impeller being monitored.

The ICI device 400 can be implemented in any suitable manner. For example, the ICI device 400 can be implemented as an Analog/Digital (A/D) card, an embedded system, a display system, a central processing unit, a personal computer, or a digital signal processor.

The ICI device 400 detects and measures the effects resulting from various types of impeller failures. For example, the ICI device 400 measures the changes in amplitudes of the frequencies 322-330 shown in FIG. 3. Based on those changes, the ICI device 400 classifies the impeller failure.

In one aspect of operation, an operator can enter a machine configuration 404 for an impeller or a device with an impeller via the user configuration portion 402. The operator can also enter a pump rating (if any), a type of pump (if any), a type of impeller, and one or more natural frequencies. The operator can further enter information relating to the filter specification 406, the DAQ specification 408, and the sensor specification 410. In addition, the operator can enter additional user inputs 412, such as a sampling frequency, a number of samples, and class of machine, that the ICI device 400 will use to monitor the impeller.

The ICI device 400 receives sensor input signals from sensors coupled to the ICI device 400 via a number of sensor interfaces. The ICI device 400 measures and records the sensor input signals associated with normal operation of the impeller. The ICI device 400 stores the sensor input signals corresponding to normal operation of the impeller as the set of baseline signals 430.

The ICI device 400 continues to monitor the performance of the impeller based on the sampling frequency included in the additional user inputs 412. The ICI device 400 filters the input signals from the sensors using the filter 442. The vibration signature processor 444 applies the FFT analysis 446 to all of the component characteristics (e.g., frequencies) in the filtered signals. The FFT analysis 446 may yield only the relevant frequencies related to the impeller being monitored.

The FFBS 448 isolates one or more frequencies and amplitudes that will be used in signal reconstruction 450 to reconstruct the signal. Once the signal is reconstructed using those selected frequencies and amplitudes, the vibration signature processor 444 determines statistical features 452 of the reconstructed signal. In some embodiments, the statistical feature 452 is a Root Mean Square (RMS) value. Thereafter, the vibration signature processor 444 produces a normalized signal by performing a normalization 454 of the reconstructed signal with respect to the baseline signal 430. The ICI device 400 can then apply various rules to the normalized signal. These rules may include Fuzzy Rule-Based Diagnostics 456 and/or Rule-Based Diagnostics 458.

The ICI device 400 presents an output of the results via the output interface 470. In some embodiments, the output interface 470 only provides an output when the ICI device 400 has determined that a fault condition exists (such as when the normalized signal differs from the baseline signals 430 by one or more threshold values). In these embodiments, the output interface 470 can provide the output by flagging, illuminating, or otherwise displaying the indicator associated with the failure (e.g., via the impeller wear indicator 472, the impeller crack indicator 474, the cavitations indicator 476, or the impeller health indicator 478).

Figure 5A:
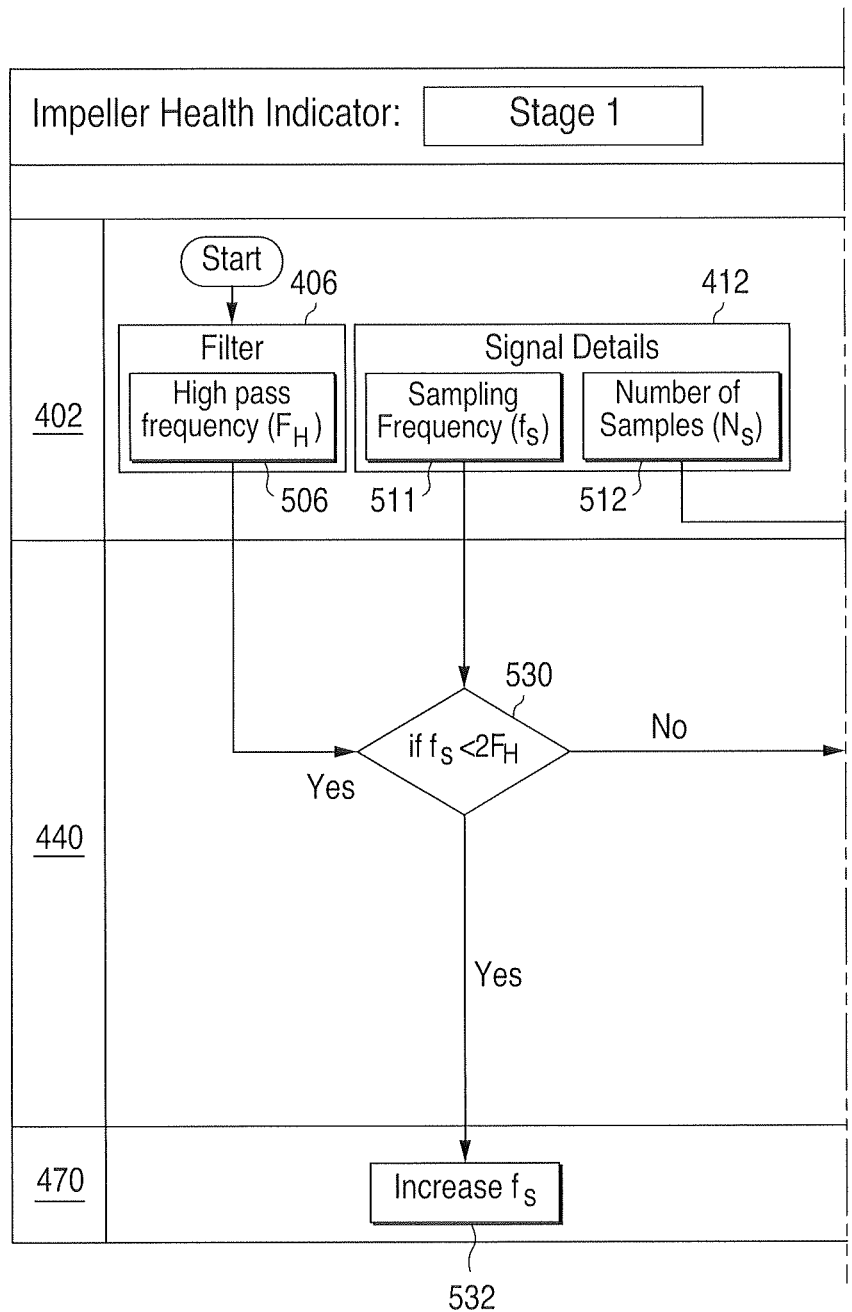
FIG. 5 illustrates a more detailed view of an example ICI first stage operation for monitoring the health of an impeller according to this disclosure.
Figure 5A:
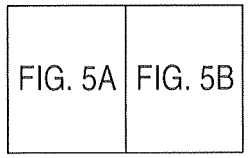
Figure 5B:
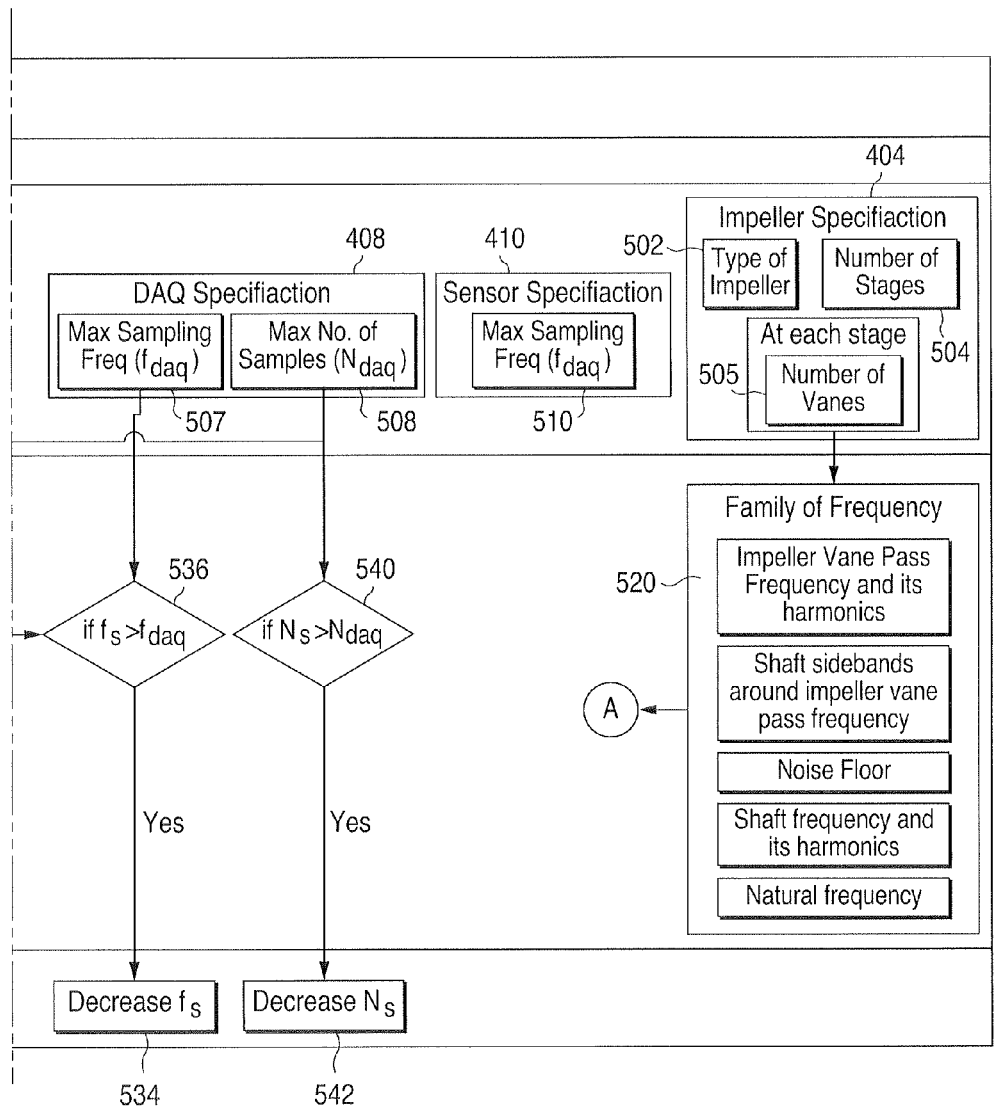

FIG. 5 illustrates a more detailed view of an example ICI first stage operation 500 for monitoring the health of an impeller according to this disclosure. The embodiment of the ICI first stage operation 500 shown in FIG. 5 is for illustration only. Other embodiments of the ICI first stage operation 500 could be used without departing from the scope of this disclosure.

During a configuration stage, the operator enters data related to an impeller to be monitored, such as the filter specification 406, signal details (e.g., additional user inputs 412), the DAQ specification 408, the sensor specification 410, and the impeller specification (e.g., machine configuration 404). In this example, the operator can enter a type of impeller 502, a number of stages 504, a number of vanes 505 for each stage, a high-pass filter frequency $F_H$ 506, a maximum sampling frequency $f_{daq}$ 507 and a maximum number of samples $N_{daq}$ 508 for data acquisition, a maximum sampling frequency $f_{daq}$ 510 for each sensor, and a sampling frequency $f_s$ 511 and a number of samples $N_s$ 512.

The ICI device 400 also determines a Family of Frequencies (FoF) 520 for the impeller (or for each stage of the impeller if multiple stages are monitored). For example, the AI portion 440 can determine the vane pass frequency $f_{vane}$ 324 and at least three harmonics for each vane pass frequency $f_{vane}$ 324. The AI portion 440 can also determine the shaft frequency $f_r$ 322 and shaft sidebands $f_{vane}-f_r$ 326 and $f_{vane}+f_r$ 328 around the vane pass frequency $f_{vane}$ 324. It will be understood that although three harmonics for each vane pass frequency $f_{vane}$ 324 are illustrated, embodiments with other than three harmonics could be used. In addition, the AI portion 440 can determine a natural frequency for the impeller.

The AI portion 440 also determines if the operator has entered appropriate values for $F_H$ 506, $f_s$ 511, and $N_s$ 512. For example, the AI portion 440 compares $f_s$ 511 to $F_H$ 506 during a comparison 530. If $f_s$ 511 is less than twice $F_H$ 506 ($f_s<2F_H$), the AI portion 440 triggers an increase $f_s$ 511 indicator 532 in the output interface 470 of the ICI device 400. The increase $f_s$ indicator 532 provides a visual or audible cue to the operator that the value entered for $f_s$ 511 is too low and should be increased.

If the AI portion 440 determines that a sufficient $f_s$ 511 has been entered (e.g., $f_s$ 511 is not less than twice $F_H$ 506 such that $f_s \geq 2 F_H$), the AI portion 440 compares $f_s$ 511 to $f_{daq}$ 507 during a comparison 536. If $f_s$ 511 is greater than to $f_{daq}$ 507 ($f_s>f_{daq}$), the AI portion 440 triggers a decrease $f_s$ indicator 534 in the output interface 470. The decrease $f_s$ indicator 534 provides a visual or audible cue to the operator that the value entered for $f_s$ 511 is too high and should be decreased.

The AI portion 440 also compares $N_s$ 512 against $N_{daq}$ 508 during a comparison 540. If $N_s$ 512 is greater than $N_{daq}$ 508 ($N_s>N_{daq}$), the AI portion 440 triggers an decrease $N_s$ indicator 542 in the output interface 470. The decrease $N_s$ indicator 542 provides a visual or audible cue to the operator that the value entered for $N_s$ 512 is too high and should be increased. If $N_s$ 512 is less than or equal to $N_{daq}$ 508 ($N_s \leq N_{daq}$), the AI portion 440 either disables the decrease $N_s$ indicator 542 (if the decrease $N_s$ indicator 542 is enabled) or does nothing (if the decrease $N_s$ indicator 542 is not enabled).

Figure 6A:
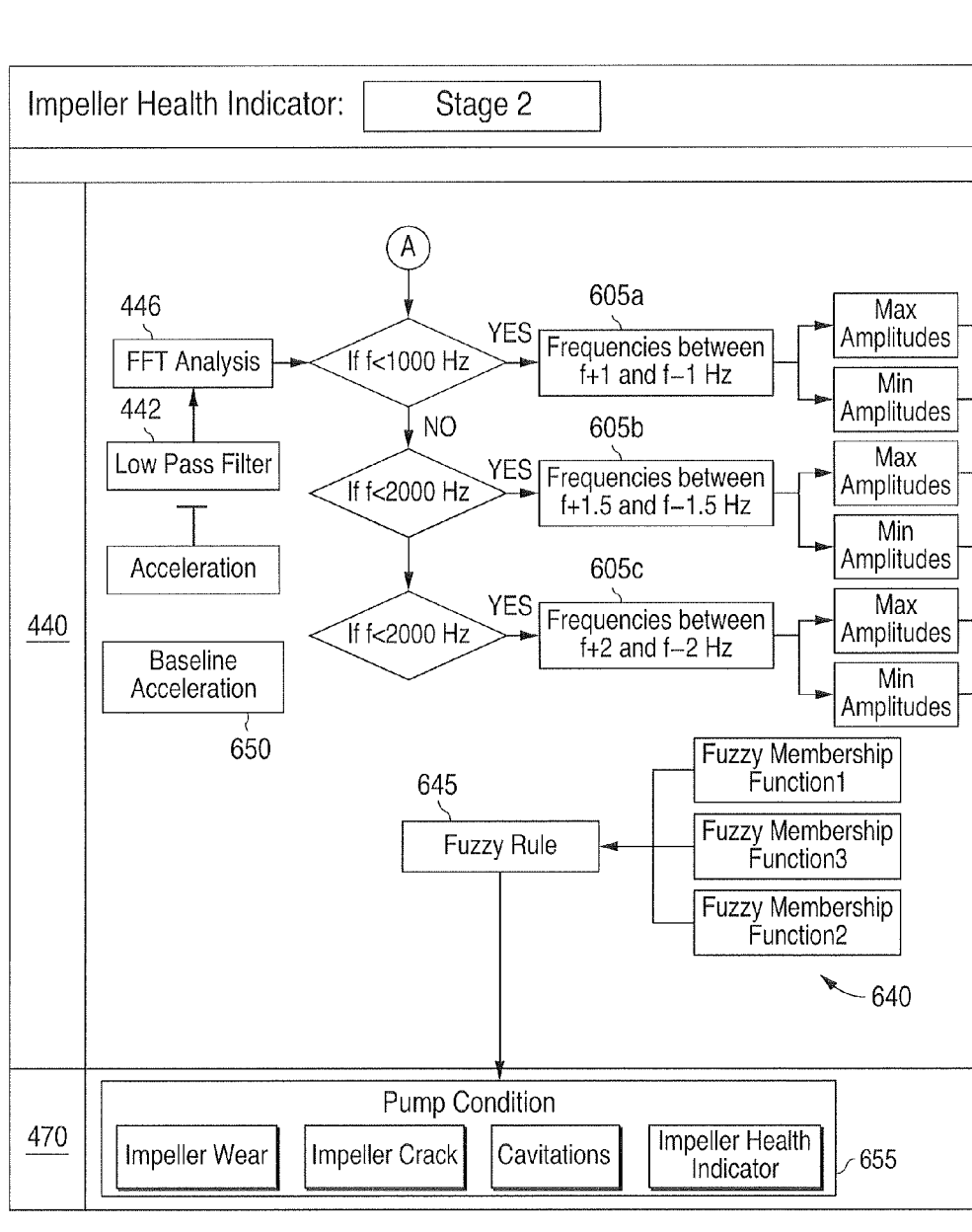
FIG. 6 illustrates a more detailed view of an example ICI second stage operation for monitoring the health of an impeller according to this disclosure.
Figure 6B:
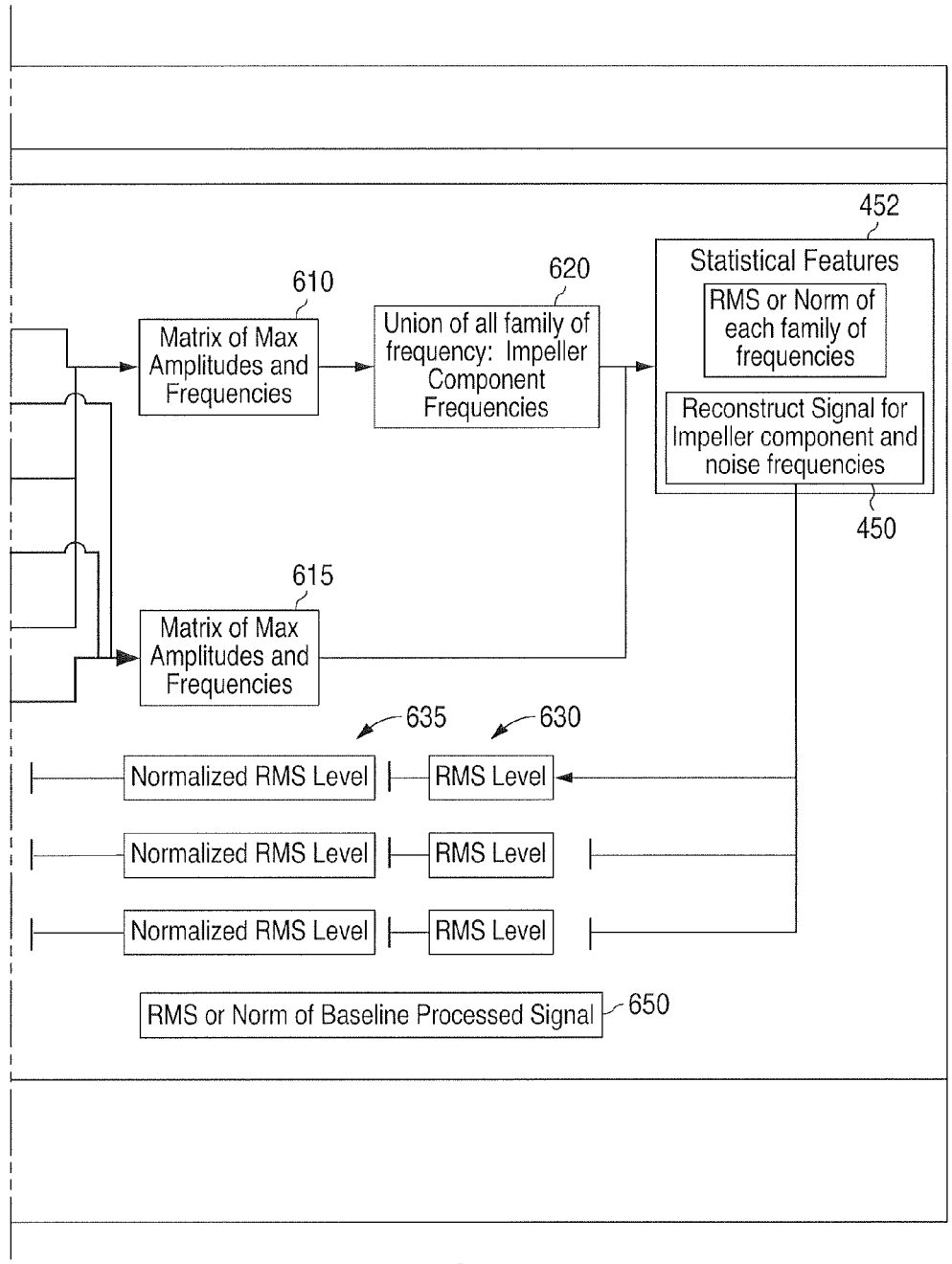

FIG. 6 illustrates a more detailed view of an example ICI second stage operation 600 for monitoring the health of an impeller according to this disclosure. The embodiment of the ICI second stage operation 600 shown in FIG. 6 is for illustration only. Other embodiments of the ICI second stage operation 600 could be used without departing from the scope of this disclosure.

After the AI portion 440 has computed the Family of Frequencies 520 for the sensor input signals, the AI portion 440 processes the FoF 520 through the low-pass filter 442 and applies the FFT analysis 446. The low-pass filter 442 can be a Butterworth filter, a wavelet-based filter, or any other low pass filter. The FoF 520 is passed through the FFBS 448, which, in this example, includes a number of band-pass filters paths 605a-605c. A 2 Hz band (e.g., from f+1 Hz to f−1 Hz) 605a is applied to the signals from the FFT analysis 446 whose value is less than 1000 Hz (f<1000 Hz). A 3 Hz band (e.g., from f+1.5 Hz to f−1.5 Hz) 605b is applied to the signals from the FFT analysis 446 whose value is less than 2000 Hz but greater than or equal to 1000 Hz (1000 Hz≤f<2000 Hz). A 4 Hz band (e.g., from f+2 Hz to f−2 Hz) 605c is applied to the signals from the FFT analysis 446 whose value is greater than or equal to 2000 Hz (f≥2000 Hz).

The AI portion 440 computes the minimum and maximum amplitudes for each band 605a-605c. The AI portion 440 then combines each of the maximums from the bands 605a-605c to generate a matrix of maximum amplitudes and frequencies 610. The AI portion 440 also combines each of the minimums from the bands 605a-605c to generate a matrix of minimum amplitudes and frequencies 615. The AI portion 440 creates a union 620 of all frequencies in the FoF 520 to identify the impeller component frequencies.

The AI portion 440 applies statistical features 452 to the union 620 and the matrix of min amplitudes and frequencies 615. The statistical features 452 can include determining the RMS or norm of each FoF 520. Thereafter, the AI portion 440 performs signal reconstruction 450 for the impeller component and noise frequencies to generate reconstructed signals for the impeller. In this example, the reconstructed signals represent an acceleration. In particular, the AI portion 440 can reconstruct a signal for the vane and harmonics, a signal for the shaft and shaft sideband frequencies, and a signal for noise frequencies.

Each of the reconstructed signals is passed through an RMS level detector 630, a normalized RMS level detector 635, and one of three fuzzy membership functions 640. The outputs of the fuzzy membership functions 640 are passed through fuzzy rules 645 to produce a fuzzy rule signal. The AI portion 440 compares the fuzzy rule signal to a number of indexes within an RMS or norm baseline signal 650 to produce one or more impeller or pump conditions 655. Note that the fuzzy membership functions 640 and fuzzy rules 645 could be replaced by other logic, such as when the rule-based diagnostics 458 are used.

The impeller or pump conditions 655 provide an indication that reflects the health of an impeller or pump based on, in this example, a sensed vibration. The ICI device 400 can output an impeller or pump condition that identifies impeller wear, impeller crack, and/or cavitations using the output interface 470.

In some embodiments, the ICI device 400 includes a number of threshold values stored in a memory, and the ICI device 400 can compare the identified conditions 655 to the threshold values stored in memory to determine whether to initiate an alarm or other action. The memory can be any computer readable medium, such as any electronic, magnetic, electromagnetic, optical, electro-optical, electromechanical, and/or other memory device that can contain, store, communicate, propagate, or transmit data. In particular embodiments, the threshold values could include a warning threshold and an alarm threshold for each condition 655 calculated by the ICI device 400. The warning threshold could trigger a warning that an impeller condition 655 is high, while an alarm threshold could trigger an alarm that a fault has been detected in an impeller.

Figure 7:
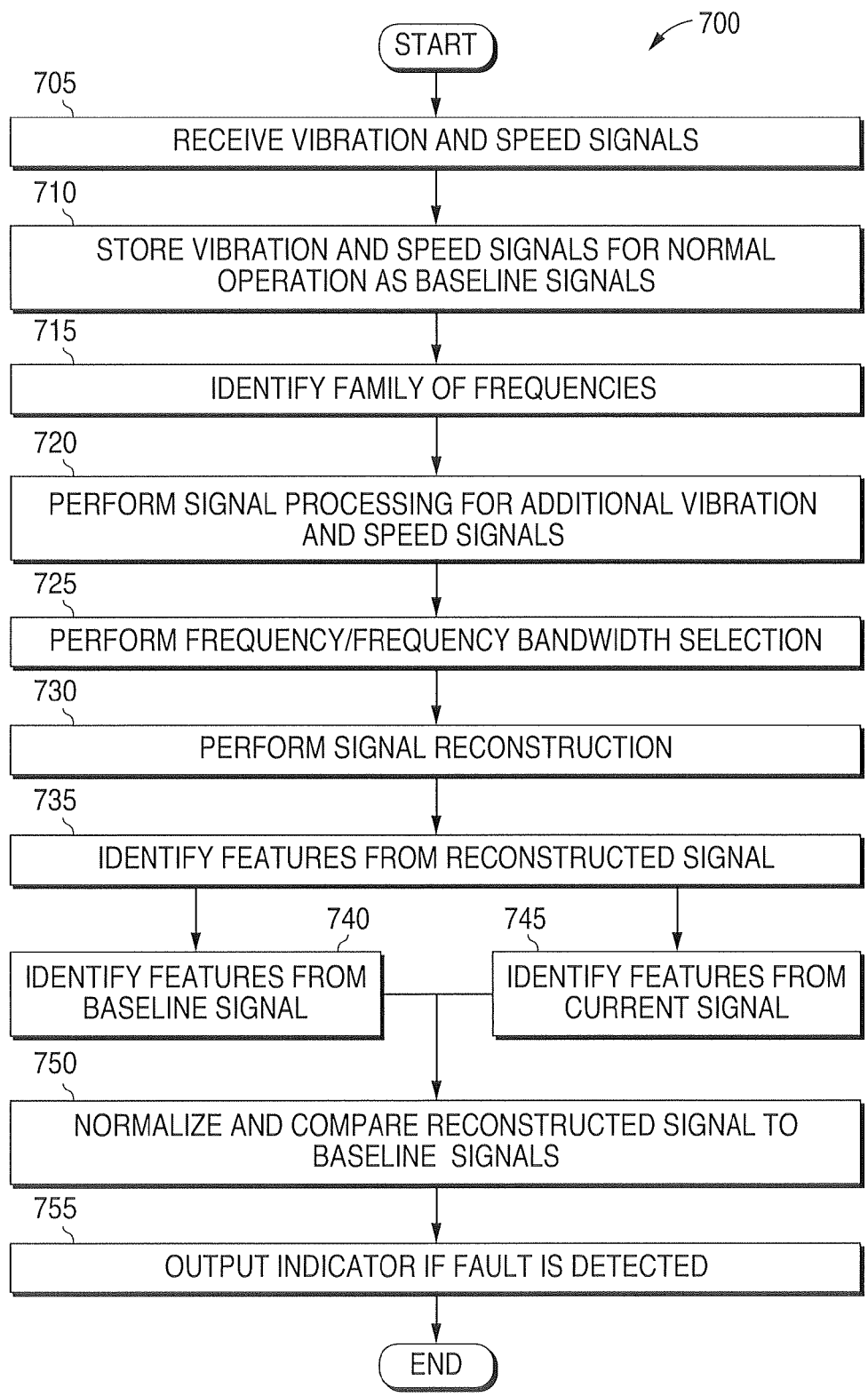
FIG. 7 illustrates an example process for monitoring an impeller according to this disclosure.

FIG. 7 illustrates an example process 700 for monitoring an impeller according to this disclosure. The embodiment of the process 700 shown in FIG. 7 is for illustration only. Other embodiments of the process 700 could be used without departing from the scope of this disclosure. Also, for ease of explanation, the process 700 is described with respect to the ICI device 400, although the process 700 could be used with any suitable device or system.

In this example, the ICI device 400 uses vibration and speed signals, as processed and compared to the thresholds, to alert an operator to possible damage in an impeller. The vibration and speed signals are received by the ICI device 400 at step 705. The ICI device 400 stores the vibration and speed signals obtained during normal operation of the impeller as baseline signals at step 710. The ICI device 400 determines the relevant family of frequencies for the impeller at step 715. This may include, for example, determining the FoF 520 for each of the failure modes of the impeller. The FoF 520 can include a vane pass frequency and its harmonics, a shaft rotating frequency, sidebands of the shaft rotating frequencies around the vane pass frequency and its harmonics, and background noise. The ICI device 400 can measure the vibration signals and estimate the frequencies of the vibration signals using any available technique, such as FFT analysis.

The ICI device 400 continues to receive vibration and speed signals and performs signal processing at step 720. This may include, for example, decomposing the vibration and speed signals. The signal processing may also include a low-pass filter operation and an FFT analysis. In some embodiments, deconstruction (e.g., decomposition) is accomplished using a Fourier series, a Laplace transform, or a Z-transform. The ICI device 400 performs frequency/frequency bandwidth selection using the processed signals at step 725. This may include, for example, isolating frequencies and obtaining minimum and maximum frequencies and amplitudes. The ICI device 400 reconstructs the signal at step 730, such as by reconstructing an overall signal and reconstructing signals for the vane pass frequencies and its harmonics, the shaft sidebands, and the background noise. The ICI device 400 identifies one or more features from the reconstructed signal in step 735. For example, the ICI device 400 can determine features such as RMS and Kurtosis values. The ICI device 400 also identifies corresponding features in the base line signal in step 740 and the current signal in step 745. The reconstructed signals are normalized with respect to the features of the baseline signals or other indices at step 750. For example, the reconstructed signals can be normalized by dividing the features from the current signal, found in step 745, by the features from the baseline, found in step 750. The normalizing helps to generalize the model with respect to the size of a mechanical system and application type. In the event a reconstructed signal exceeds one of the thresholds, the ICI device 400 outputs the appropriate indicator (e.g., the impeller wear indicator, impeller crack indicator, and/or cavitations indicator) in step 755. The ICI device 400 applies fuzzy-rule based diagnostics to determine if the reconstructed signal exceeds one of the thresholds.

In some embodiments, the vibration and speed signals stored are for an impeller that currently is experiencing wear or currently includes a crack. In such embodiments, the ICI device 400 provides a warning or alarm based on a change in the signals resulting from additional wearing or further cracking of the impeller.

Figure 8:
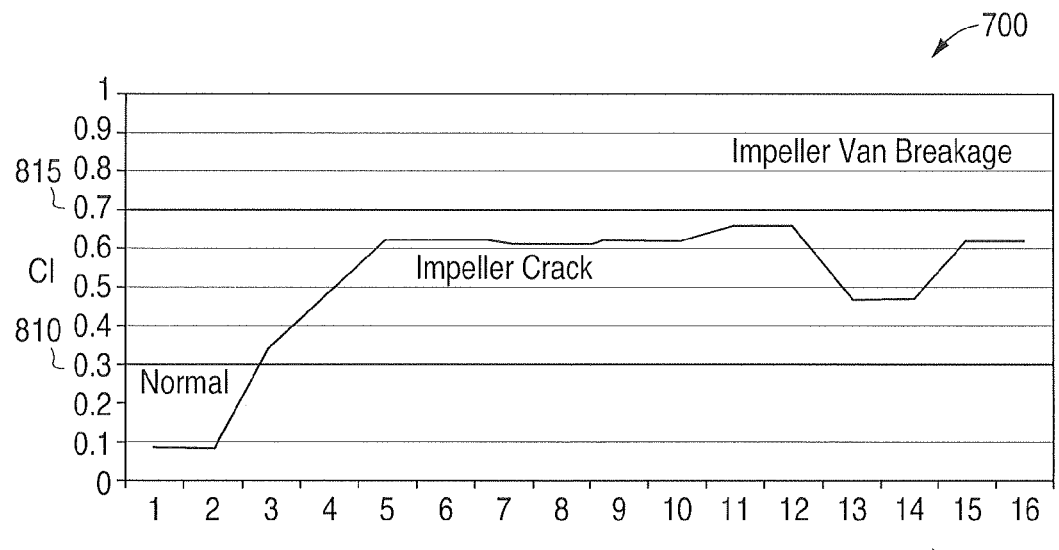
FIGS. 8 and 9 illustrate example impeller health indicators according to this disclosure.
Figure 9:
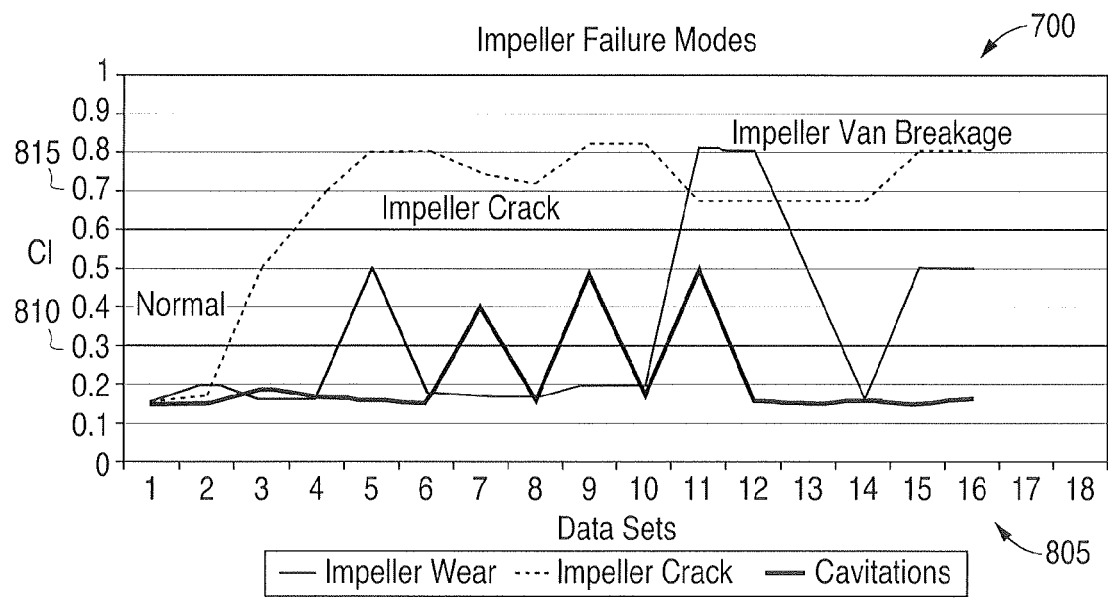

FIGS. 8 and 9 illustrate example impeller health indicators 478 according to this disclosure. The embodiments of the impeller health indicators 478 shown in FIGS. 8 and 9 are for illustration only. Other embodiments of the impeller health indicator 478 could be used without departing from the scope of this disclosure.

In these examples, the impeller health indicator 478 is constructed using a feature fusion of statistics on the basis of Fuzzy, Dempter-Shafer, or Bayesian theory. The health indicator 478 provides a severity index varying between a value of 0 and a value of 1. The impeller health indicator 478 includes a time 805 and two threshold values 810 and 815.

Although the figures above have illustrated various embodiments, any number of modifications could be made to these figures. For example, any suitable types of impellers could be monitored, and any suitable types of faults could be detected. Also, various functions shown as being performed by the ICI device 400 could be combined, further subdivided, or omitted and additional functions could be added according to particular needs. In addition, while FIG. 7 illustrates a series of steps, various steps in FIG. 7 could overlap, occur in parallel, occur multiple times, or occur in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   an input interface configured to receive an input signal associated with at least one stage of an impeller and with two or more frequencies associated with operation of the impeller;
   a processor configured to identify a specific failure mode in the impeller using the input signal; and
   an output interface configured to provide an indicator identifying a health of the impeller;
   wherein the processor is configured to identify the specific failure mode by:
   determining a family of frequencies related to at least one of the two or more frequencies associated with operation of the impeller, the family of frequencies including a vane pass frequency and its harmonics;
   decomposing the input signal by performing a transform of the input signal and isolating components of the transformed input signal into selected frequency bands;
   reconstructing an impeller signal using portions of the decomposed input signal within the selected frequency bands associated with the family of frequencies;
   comparing the reconstructed impeller signal to a baseline signal; and
   categorizing the comparison based on failure mode rules including effects that the specific failure mode has on the two or more frequencies associated with operation of the impeller.

2. The apparatus of claim 1, wherein:
   the two or more frequencies associated with operation of the impeller comprise the vane pass frequency, a rotating shaft speed frequency, a shaft sideband frequency, and a background noise frequency; and
   the reconstructed impeller signal comprises at least one of:
   a signal associated with the vane pass frequency and its harmonics;
   a signal associated with the rotating shaft speed frequency;
   a signal associated with the shaft sideband frequency; and
   a signal associated with the background noise frequency.

3. The apparatus of claim 1, wherein the processor is configured to decompose the input signal through a plurality of band-pass filters.

4. The apparatus of claim 3, wherein the processor is configured to reconstruct the impeller signal by:
   determining maximum and minimum amplitudes in the selected frequency bands in outputs of the band-pass filters;
   combining the maximum amplitudes to produce a first matrix;
   combining the minimum amplitudes to produce a second matrix; and
   reconstructing multiple impeller signals using the first and second matrices.

5. The apparatus of claim 1, wherein the processor further is configured to:
   normalize the reconstructed signal with the baseline signal; and
   apply a feature fusion technique to obtain a value for use by the indicator.

6. The apparatus of claim 1, wherein the processor is further configured to store a portion of the input signal, corresponding to normal operation of the impeller, as the baseline signal.

7. The apparatus of claim 1, wherein the indicator identifying the health of the impeller comprises at least one of: an impeller wear indicator, an impeller crack indicator, a cavitation indicator, and an impeller health indicator.

8. The apparatus of claim 1, wherein:
   the input signal comprises at least one of: vibration information in a time domain and speed information in the time domain associated with the impeller;
   the input interface comprises multiple input interfaces; and
   the processor comprises an artificial intelligence portion, and
   the reconstructed impeller signal comprises a time domain signal.

9. A system comprising:
a plurality of sensors configured to measure one or more characteristics of an impeller; and
an impeller condition indicator device comprising:
- an input interface configured to receive input signals from the sensors, each of the input signals associated with at least one stage of the impeller and with two or more frequencies associated with operation of the impeller;
- a processor configured to identify a specific failure mode in the impeller using the input signals; and
- an output interface configured to provide an indicator identifying a health of the impeller;
- wherein the processor is configured to identify the specific failure mode by, for each of the input signals:
    - determining a family of frequencies related to at least one of the two or more frequencies associated with operation of the impeller, the family of frequencies including a vane pass frequency and its harmonics;
    - decomposing the input signal by performing a transform of the input signal and isolating components of the transformed input signal into selected frequency bands;
    - reconstructing an impeller signal using portions of the decomposed input signal within the selected frequency bands associated with the family of frequencies;
    - comparing the reconstructed impeller signal to a baseline signal; and
    - categorizing the comparison based on failure mode rules including effects that the specific failure mode has on the two or more frequencies associated with operation of the impeller.

10. The system of claim 9, wherein:
the two or more frequencies associated with operation of the impeller comprise the vane pass frequency, a rotating shaft speed frequency, a shaft sideband frequency, and a background noise frequency; and
the reconstructed impeller signal comprises at least one of:
- a signal associated with the vane pass frequency and its harmonics;
- a signal associated with the rotating shaft speed frequency;
- a signal associated with the shaft sideband frequency; and
- a signal associated with the background noise frequency.

11. The system of claim 9, wherein the processor is configured to, for each of the input signals, decompose the input signal through a plurality of band-pass filters.

12. The system of claim 11, wherein the processor is configured to reconstruct the impeller signal by:
determining maximum and minimum amplitudes in the selected frequency bands in outputs of the band-pass filters;
combining the maximum amplitudes to produce a first matrix;
combining the minimum amplitudes to produce a second matrix; and
reconstructing multiple impeller signals using the first and second matrices.

13. The system of claim 9, wherein the processor is further configured to store a portion of each of the input signals, corresponding to normal operation of the impeller, as the baseline signal.

14. The system of claim 9, wherein the indicator identifying the health of the impeller comprises at least one of: an impeller wear indicator, an impeller crack indicator, a cavitation indicator, and an impeller health indicator.

15. A method for identifying a health of an impeller corresponding to a specific failure mode of the impeller, the method comprising:
receiving at one or more processing devices an input signal comprising at least one of vibration and speed information corresponding to at least one stage of the impeller, the input signal associated with two or more frequencies associated with operation of the impeller;
determining a family of frequencies corresponding to at least one of the two or more frequencies associated with operation of the impeller, the family of frequencies including a vane pass frequency and its harmonics;
decomposing the input signal by performing a transform of the input signal and isolating components of the transformed input signal into selected frequency bands;
reconstructing an impeller signal using portions of the decomposed input signal within the selected frequency bands associated with the family of frequencies;
comparing the reconstructed impeller signal to a baseline signal;
categorizing the comparison based on failure mode rules including effects that the specific failure mode has on the two or more frequencies associated with operation of the impeller;
outputting an indicator identifying the health of the impeller; and
in response to determining the reconstructed impeller signal differs from the baseline signal by a threshold amount, outputting an indicator identifying a fault.

16. The method of claim 15, wherein:
the two or more frequencies associated with operation of the impeller comprise the vane pass frequency, a rotating shaft speed frequency, a shaft sideband frequency, and a background noise frequency; and
the reconstructed impeller signal comprises at least one of:
- a signal associated with the vane pass frequency and its harmonics;
- a signal associated with the rotating shaft speed frequency;
- a signal associated with the shaft sideband frequency; and
- a signal associated with the background noise frequency.

17. The method of claim 15, wherein decomposing the input signal comprises decomposing the input signal through a plurality of band-pass filters; and
wherein reconstructing the impeller signal comprises:
determining maximum and minimum amplitudes in the selected frequency bands in outputs of the band-pass filters;
combining the maximum amplitudes to produce a first matrix;
combining the minimum amplitudes to produce a second matrix; and
reconstructing multiple impeller signals using the first and second matrices.

18. The method of claim 15, further comprising:
normalizing the reconstructed signal with the baseline signal; and
applying a feature fusion technique to obtain a value for use by the indicator.

19. The method of claim 15, further comprising:
storing a portion of the at least one of vibration and speed information corresponding to normal operation of the impeller as the baseline signal.

20. The method of claim 15, wherein the threshold amount comprises a first amount associated with a warning threshold and a second amount associated with an alarm threshold.

21. The method of claim 16, wherein the failure mode rules identify at least one of:
- a high flow cavitation failure mode having an increasing effect on the background noise frequency and a decreasing effect on the vane pass frequency;
- an impeller wear failure mode having an increasing effect on the shaft sideband frequency and an increasing effect on the vane pass frequency; and
- an impeller crack failure mode having an increasing effect on the shaft sideband frequency and a decreasing effect on the vane pass frequency.

* * * * *